United States Patent
Quan

(10) Patent No.: US 6,459,795 B1
(45) Date of Patent: Oct. 1, 2002

(54) METHOD AND APPARATUS FOR ENHANCING THE SCRAMBLING OF A TV SIGNAL VIA ERRONEOUS CLAMP SIGNALS

(75) Inventor: Ronald Quan, Cupertino, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/233,922

(22) Filed: Jan. 20, 1999

Related U.S. Application Data

(60) Provisional application No. 60/076,087, filed on Feb. 26, 1998.

(51) Int. Cl.[7] .............................. H04N 7/167; H03L 7/00
(52) U.S. Cl. ....................... 380/221; 380/204; 380/210; 380/213; 348/536
(58) Field of Search ................................ 380/204, 213, 380/216, 218, 221; 348/536, 614, 616, 537; 345/98, 601, 204; 386/33, 10

(56) References Cited

U.S. PATENT DOCUMENTS

| | | | |
|---|---|---|---|
| 4,325,079 A | | 4/1982 | Little |
| 4,475,129 A | * | 10/1984 | Kagota ........................ 380/204 |
| 4,631,603 A | * | 12/1986 | Ryan ........................... 380/204 |
| 4,663,659 A | | 5/1987 | Blatter |
| 4,901,349 A | * | 2/1990 | Metzger et al. .............. 380/213 |
| 4,953,208 A | * | 8/1990 | Ideno ........................... 380/213 |
| 5,130,810 A | * | 7/1992 | Ryan ........................... 380/204 |
| 5,438,620 A | * | 8/1995 | Ryan et al. .................. 380/218 |
| 5,504,815 A | * | 4/1996 | Ryan et al. .................. 380/213 |
| 5,633,927 A | * | 5/1997 | Ryan et al. .................. 380/204 |
| 5,784,523 A | * | 7/1998 | Quan et al. .................. 380/201 |
| 6,173,109 B1 | * | 1/2001 | Quan ........................... 380/203 |
| 6,188,832 B1 | * | 2/2001 | Ryan ........................... 380/204 |
| 6,285,765 B1 | * | 9/2001 | Quan ........................... 380/204 |

FOREIGN PATENT DOCUMENTS

JP         57162896       10/1992

* cited by examiner

*Primary Examiner*—Gilberto Barron
*Assistant Examiner*—Kambiz Zand
(74) *Attorney, Agent, or Firm*—Georgia Almeida

(57) ABSTRACT

An improved television scrambling signal is achieved by adding erroneous clamp pulses into a television signal after the signal may have been previously scrambled, for example, by prior art position modulated horizontal sync pulses. Prior art scrambling systems such as those using position modulated sync pulses cause tearing in an unauthorized displayed television picture. The addition of the erroneous clamp pulses of the present invention causes both tearing and darkening of the picture. This darkening can completely shut off the display on some TV sets, thus yielding complete concealment of the television signal. In an alternative embodiment, an erroneous color "rainbow" effect is provided by modifying a portion of a color burst signal, to cause the color subcarrier system in a TV set to unlock. In another embodiment, an improved television vertical scrambling overlay method is achieved by using fewer lines for the insertion of fake vertical sync pulses in a vertical blanking interval and by turning on the fewer fake vertical pulses in a selected specific manner. This improvement provides greater vertical displacement for enhanced picture concealment while providing additional lines for other purposes.

34 Claims, 6 Drawing Sheets

STANDARD VIDEO

CLAMP PULSE & BURST GATE

MODIFIED VIDEO

MODIFIED CLAMP IN DECODER AND/OR BURST GATE FOR DECODER

BURST GATE IN DECODER

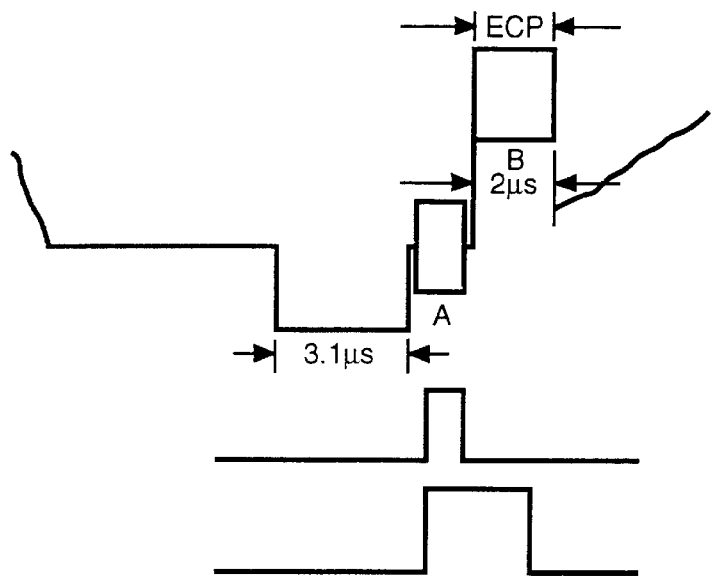
POST-SYNC WITH
ERRONEOUS CLAMP
FIG. 3A
MODIFIED CLAMP
FOR DECODER
FIG. 3B
BURST GATE
IN DECODER
FIG. 3C
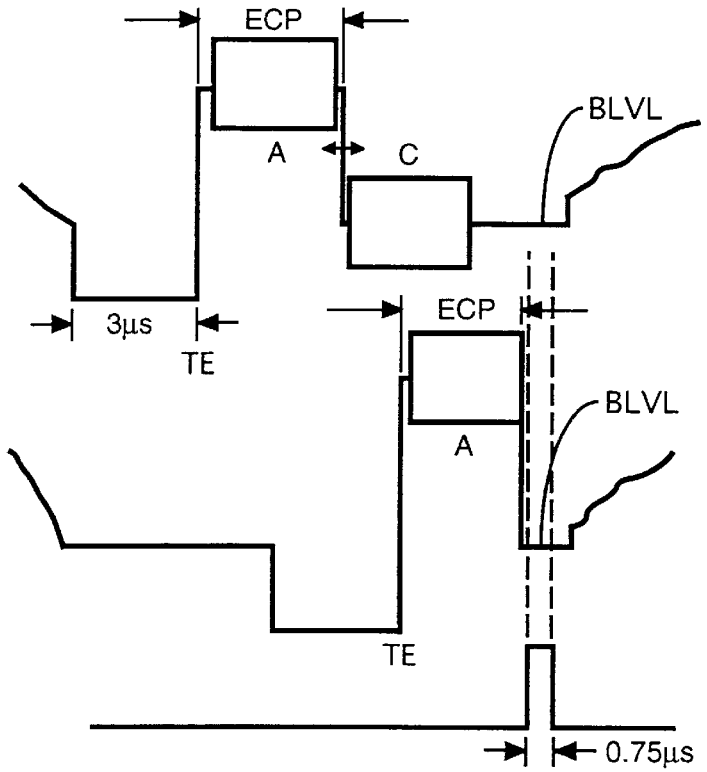
ERRONEOUS CLAMP
FOR PRE-SYNC
FIG. 4A
ERRONEOUS CLAMP
FOR POST-SYNC
FIG. 4B
DECODER
CLAMP PULSE
FIG. 4C
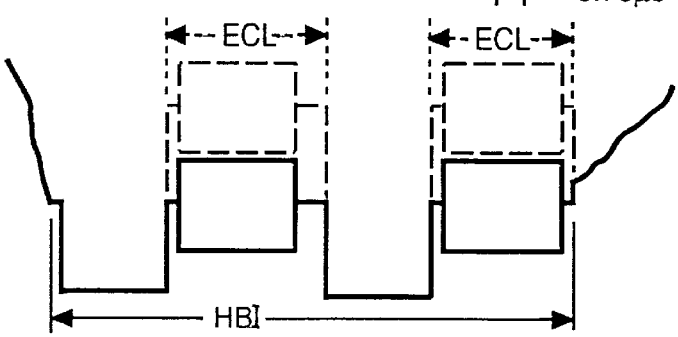
DOUBLE SYNC
FOR USE
WITH FIG. 6
FIG. 5

METHOD AND APPARATUS FOR ENHANCING THE SCRAMBLING OF A TV SIGNAL VIA ERRONEOUS CLAMP SIGNALS

This application claims the benefit of Provisional Application No. 60/076,087, filed Feb. 26, 1998.

BACKGROUND OF THE INVENTION

The present invention relates to scrambling television signals transmitted over air or via a cable or satellite environment. The invention is most effective as an improvement of the subject matter of the provisional patent application, "METHOD AND APPARATUS FOR IMPROVED HORIZONTAL AND VERTICAL OVERLAY SIGNALS FOR HIGHER CONCEALMENT IN MODERN TV SETS", Ser. No. 60/069815 ('815) filed on Dec. 16, 1997. However, the present invention can be used alone to provide concealment in the form of prohibitive darkening and/or lightening of the signal.

In the previous concealment systems, the concealment is done by causing a television picture being viewed on an unauthorized television (TV) set to tear horizontally and/or jitter vertically. In general, these effects are effective in creating an unviewable picture unless the viewing is authorized and the signal is descrambled. In a population of modern television sets, however, effectiveness is not always at the highest levels when applying the scrambling signal of such prior art techniques.

OBJECTS OF THE INVENTION

An object of this invention is to improve existing concealment systems by using an erroneous clamp pulse. This erroneous clamp pulse is removed and thus ignored by a decoder of an authorized playback device, i.e. TV set, but will produce excessive darkening (or lightening) of a picture supplied by unauthorized television sets. Because today's modern television sets now use some form of back porch clamping (for example, a clamp pulse to reference a black level starts 4.7 microseconds after the leading edge of sync), modification of the clamping signal during the horizontal blanking interval can cause a desired darkening scrambling effect.

In the preferred embodiments, this erroneous clamp pulse or signal is distinguished from the copy protection signal described in U.S. Pat. 4,631,603 ('603) and/or 5,130,810 ('810) to J. O. Ryan, both incorporated by reference, by the following distinguishing features:

1) A narrowed and/or position modulated horizontal sync pulse.
2) A modified color burst signal which may include a narrowed or widened color burst envelope.
3) The timing of the erroneous clamp pulse in the present invention is based on the TV set's clamp pulse (not a video cassette recorder's (VCR's) automatic gain control (AGC) sample pulse as generally the case), and the TV set's clamp pulse is generally timed from the leading edge of sync. In the Ryan references, the copy protection signal is based on the timing after the trailing edge of sync. That is, in copy protection signals for VCRs, an AGC pulse is timed from the trailing edge of sync or pseudo sync and the VCR's AGC sample pulse likewise is timed from the trailing edge of sync.

Another object of this invention is to improve on the effect of a vertical overlay signal by taking up fewer television lines in the vertical blanking interval (VBI) for added "fake" vertical sync pulses. By taking up fewer lines in the vertical blanking interval, more data lines in the VBI are available for other purposes.

A further object of the invention is to disclose a simpler way of inducing more vertical jitter and or rolling effects utilizing the "fake" vertical sync pulses.

To help clarify the invention over the above mentioned references, it is worthwhile to differentiate video "copy protection" techniques, such as disclosed in the '603 and '810 patents, from video "scrambling" techniques such as that of the present invention. To one skilled in the art of video engineering, video copy protection is defined as a system wherein a copy protected video signal is viewable with a minimum of or no visible artifacts, but where the playback of a recording of such a signal is not possible or produces a signal that has significantly degraded entertainment value. On the other hand, video scrambling is defined as a system wherein a video signal is made unviewable. A scrambled signal may be recordable, but unless it has been descrambled the playback of such a recording is still unviewable.

SUMMARY OF THE INVENTION

A primary feature of the present invention includes the technique of adding a pulse or signal, having a level around peak white, during or after the color burst signal, or a portion of the color burst signal. In this example, the color burst signal preferably has a narrower envelope than normal. In an embodiment in which the input video signal is previously scrambled as, for example, by horizontal sync modulation, the position modulated horizontal sync pulse preceding the narrower color burst is also narrowed. These techniques of the invention are predicated on the fact that most modern television sets use back porch clamping and use a horizontal oscillator and/or high voltage flyback pulse to form the clamp pulse. The clamp pulse is triggered by the leading edge of horizontal sync pulse and generally starts around 4.7 microseconds later. However, in a standard video signal, the back porch blanking level is approximately 4.7 microseconds after the leading edge of a horizontal sync pulse. Thus, if a pulse other than blanking level is placed around 4.7 microseconds after a leading edge of sync, then the television set will trigger (or clamp) on, and thus will display, an erroneous black level. This erroneous black level can cause the picture to darken abnormally when the pulse is higher than the normal blanking level, or brighten abnormally when the pulse is lower than the normal blanking level. Since extra concealment in a scrambled TV signal is the goal of the present invention, the abnormal or excessive darkening or lightening of the displayed scrambled picture caused by the present invention provides a highly effective scrambling technique wherein a displayed TV picture not only is torn horizontally and jittered vertically, but also is excessively darkened or lightened.

Therefore, a preferred embodiment of the invention includes the narrowing of both the horizontal sync and color burst envelope and then the adding of an erroneous clamp pulse (ECP) around peak white level after the narrowed color burst. Note that in one embodiment, the narrowed sync pulse and color burst, along with the added erroneous clamp pulse (ECP), are all being position shifted or modulated. In an alternative embodiment, the color burst envelope does not need to be shortened, but rather can be of normal or longer length. This is done by including at least a part of the color burst superimposed on the erroneous clamp pulse. In this instance, a decoder of the TV set can be made to have a shortened back porch clamp pulse not coincident with the erroneous pulse. To recover color burst, the decoder's color burst gate pulse can occur after the trailing edge of sync because the associated chroma band pass filter will reject the erroneous pulse portion of the signal and will only pass through the color subcarrier frequency.

The present invention can be implemented alone as an effective scrambling system, or preferably can be combined with the techniques as described for example, in the '815 provisional application of previous mention, or in U.S. Pat. Nos. 5,504,815, 5,438,620 or 5,058,157 (all incorporated by reference) for an even more enhanced scrambling signal. In the latter combinations, the invention causes darkening (or lightening) that is combined with horizontal tearing and vertical instability along with horizontal picture displacement and inverted video as described in the above patents. That is, the resulting scrambled signal will have horizontal tearing due to position (or shift) modulated horizontal sync edge or edges, vertical jittering due to deleting standard vertical sync pulses and replacing them with modulating vertical sync pulses, inverted video, and line position modulating on the video, as well as the darkening (or lightening) of the scrambled signal via the erroneous clamp pulse signals in the horizontal blanking interval, in accordance with the present invention.

Another alternative embodiment of this invention includes modifying a last portion of the color burst signal so as to cause the color subcarrier system in an unauthorized TV set to unlock and cause an erroneous color display.

Yet another alternative feature of this invention includes the generation of a known location for a decoder's clamping system for example, a dedicated black level interval or a sync tip interval, and to incorporate sync/AGC pulse pair signals as disclosed in the Ryan '603 and/or '810 patents of previous mention, for even more darkening when combined with a scrambled signal. The use of position modulated (or shifted) sync/AGC pulse pair signals is motivated by the fact that certain TV sets respond to this type of signal by darkening completely (not to mention the horizontal tearing that also is present).

Another modification of the '815 provisional application of previous mention, includes a unique method of utilizing fewer lines in the vertical blanking interval for the vertical overlay signal while providing more concealment by increased vertical instability.

BRIEF DESCRIPTION OF THE DRAWINGS

FIG. 3A is a waveform illustrating a post-sync pulse position of the modified horizontal sync pulse and the erroneous clamp pulse (ECP) with color subcarrier in portion B. Note that the sync pulse is now moved toward the beginning of the following active TV line for maximum horizontal tearing and that the burst portion C has collapsed. The sync position of FIG. 2A moves or shifts to the position of FIG. 3A with a displacement of about 5 $\mu s$ or more, at a rate, for example, of 665 Hz for maximum tearing.

FIG. 3B is a waveform illustrating a narrowed clamp pulse of the decoder of a descrambler for correctly clamping the video to the blanking level for the FIG. 3A waveform.

FIG. 3C is a waveform illustrating a burst gate pulse for the decoder for gating the correct burst phase for the FIG. 3A waveform.

FIG. 4A is a waveform illustrating a more effective erroneous clamp pulse (ECP) signal which occurs immediately after the trailing edge (TE) of the horizontal sync. Color subcarrier is added after the trailing edge of sync as well. FIG. 4A also includes a dedicated blanking level location (BLVL) for a modified decoder clamp pulse for clamping to the correct blanking level. The horizontal sync in FIG. 4A is in the pre-sync position.

FIG. 4B is a waveform illustrating a more effective erroneous clamp pulse (ECP) signal similar to that of FIG. 4A, but where the horizontal sync pulse is now in the post-sync position and the burst portion C is collapsed.

FIG. 4C is a waveform illustrating an alternate location of the decoder's clamp pulse for the waveforms of FIGS. 4A and 4B.

FIG. 5 is a waveform illustrating a double sync scrambled TV signal used optionally in conjunction with added fake vertical sync pulses such as provided by the circuitry of FIG. 6, which may or may not include ECP signals.

DESCRIPTION OF THE PREFERRED EMBODIMENTS

Figure 7:
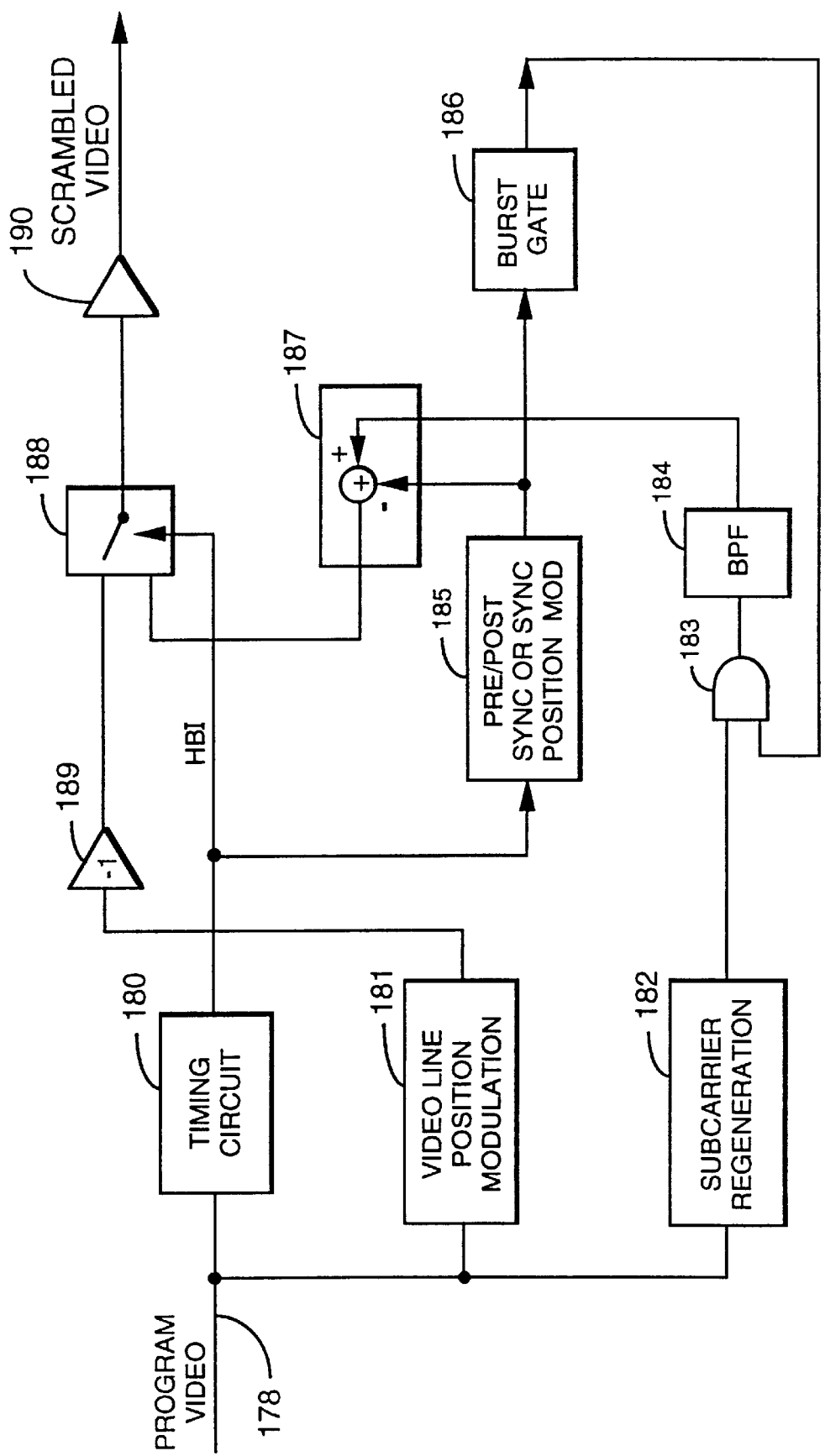
FIG. 7 is a block diagram illustrating circuitry of the '815 provisional application for generating a scrambled video program signal using video line position modulation, video inversion and horizontal sync overlay techniques. The output also may include a vertical sync overlay signal (not shown here).

FIG. 7 is a block diagram of the general implementation of the '815 provisional application of previous mention. Program (unscrambled) video is supplied on input 178 to a timing circuit 180 to generate a horizontal blanking interval (HBI) signal for a switch 188 and for a sync modulation circuit 185. The first level of scrambling is done by a video line position modulator circuit 181 which receives the program video on input 178 and which position modulates the video on a line by line basis. Circuit 181 is coupled to an inverter circuit 189 which inverts only the active video portion. The output of circuit 189 is inverted active video that is line position modulated and is supplied to a switch 188 which replaces the horizontal sync from the inverter circuit 189 with new sync and color burst. The new sync is position modulated within the HBI or switched between a number of relative positions in the HBI. The sync modulation circuit 185 provides the various sync (edge) positions. A color subcarrier is regenerated by a circuit 182 also coupled to the program video input 178, and the subcarrier is gated through an AND gate 183 by a gate signal from a burst gate circuit 186. The circuit 186 triggers off the trailing sync edge of the sync modulation circuit 185. The output of AND gate 183 is supplied to a chroma band pass filter 184. The output of circuit 184 is summed in an adder circuit 187 with the output of the sync modulation circuit 185 in negative fashion. The output of the adder circuit 187 then has new sync (position modulated and the like) and new burst. The switch 188 inserts the new sync and burst into the position modulated video from the inverter circuit 189. The combined video signal then is supplied to an amplifier 190. The output of the amplifier 190 then may be supplied to the circuit of FIG. 8 as an initially scrambled video signal from for example the '815 provisional application.

Figure 1A:
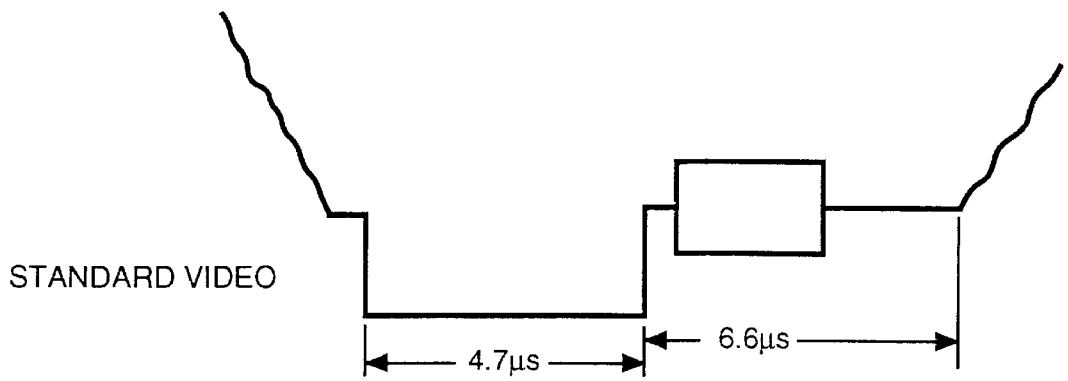
FIG. 1A is a waveform showing a standard video signal primarily in the horizontal blanking interval.
Figure 1B:
FIG. 1B is a waveform illustrating a pulse turned on 4.7 microseconds after the leading edge of horizontal sync in FIG. 1A and which is used in TV sets for clamping to a blanking level and for gating in the color burst for the color subcarrier oscillator in the TV set.
Figure 2A:
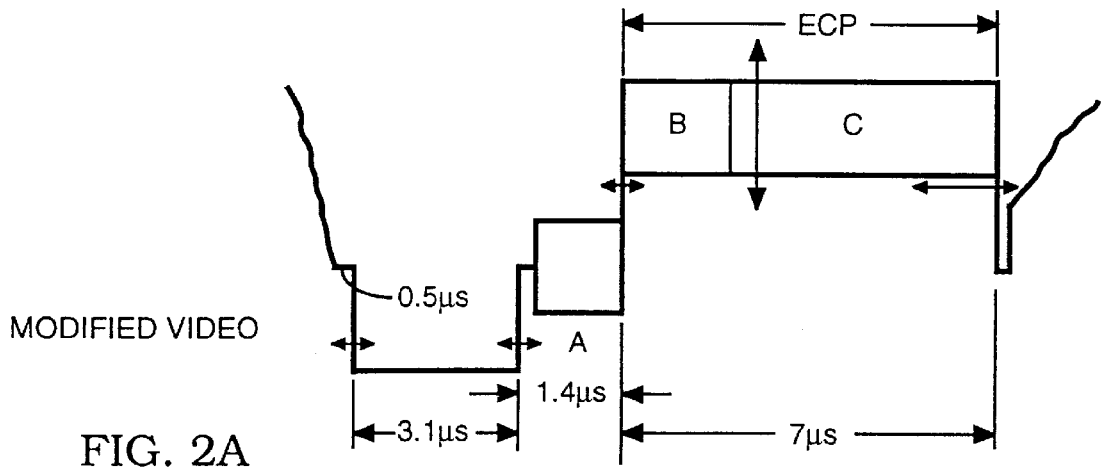
FIG. 2A is a waveform illustrating an embodiment of the invention where the horizontal sync pulse is moved close to the front porch (pre-sync position) to allow maximum horizontal tearing when the sync pulse is position modulated. The horizontal sync is also narrowed to about 3.1 microseconds ($\mu s$). A color burst portion A is about 4 to 5 cycles of subcarrier (about 1.4 $\mu s$) and is added to the normal clamp level. The B and C portions of FIG. 2A include an erroneous clamp pulse (ECP) such as a positive pedestal voltage, with color burst added. In this example, both portions A and B have the correct color subcarrier frequency while the portion C has incorrect color subcarrier frequency and/or phase. However, if an erroneous color display is not desired, the portion C can have the correct color burst frequency or phase. The duration of portion B is about 2 $\mu s$ (or more) and the duration of portion C preferably varies by modulation. In the pre-sync position as shown here, portion C is about 5 $\mu s$ duration. Note that the pulse in FIG. 1B is coincident with portion C for burst gate and is a feature of the invention which causes an erroneous color display.
Figure 2B:
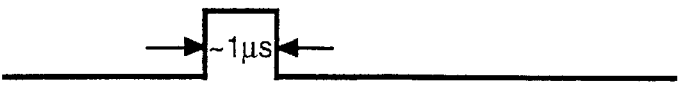
FIG. 2B is a waveform illustrating a narrowed clamp pulse for FIG. 2A waveform, for use by a decoder in the descrambler system to correctly clamp the scrambled video to blanking level. The pulse in FIG. 2B can also be used as the burst gate for the decoder's burst phase loop oscillator.
Figure 2C:
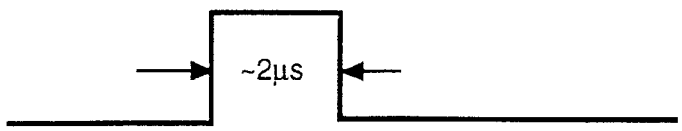
FIG. 2C is a waveform illustrating a burst gate pulse for the decoder that gates through the correct chroma burst for the FIG. 2A color burst portions A and B, but not C, for the decoder.
Figure 9:
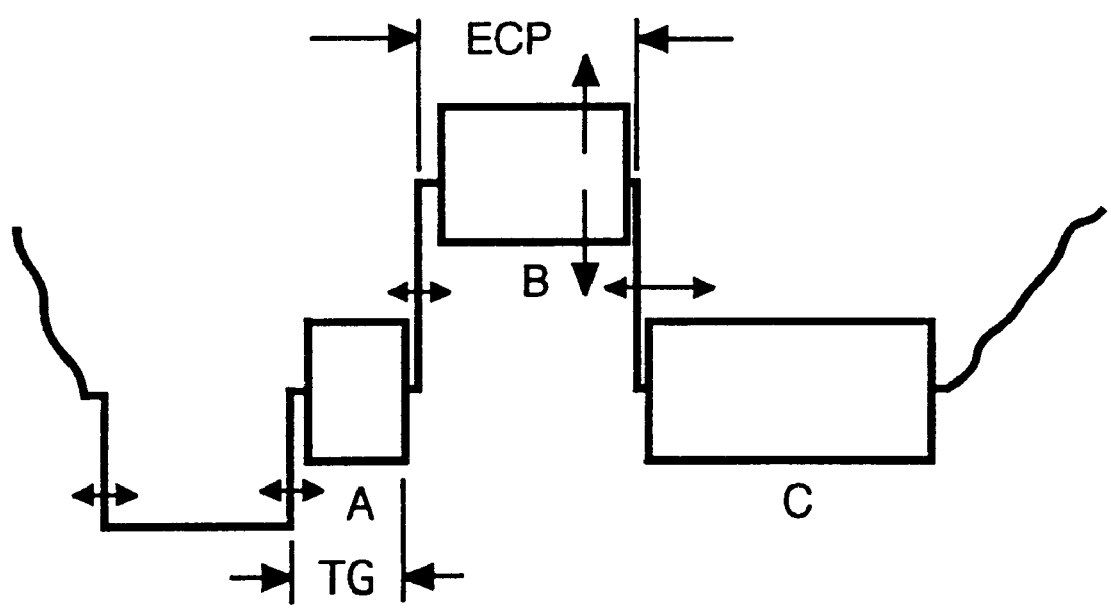
FIG. 9 is a resultant waveform of the circuit of FIG. 8 for providing modifications in the horizontal blanking interval. The waveform also illustrates that the ECP can be amplitude modulated to cause the darkening effect to flicker. The ECP can also be pulse width or position modulated to create the same type of effect as caused by the amplitude modulation, that is, causing the darkening effect to flicker.

The embodiments of the present invention are particularly useful in enhancing the teachings of the '815 provisional application; that is, to add to the concealment provided by the scrambled signal described in FIG. 7. For certain types of program material such as adult viewing, maximum scrambling concealment is desired. The preferred embodiments of the invention thus add darkening effects that can effectively blank out the TV set. It is these embodiments that cause a TV set to lock onto a horizontal sync signal which has been position modulated, for example, and then cause the TV set to erroneously clamp not to blanking level but for example to a white level to cause the picture to darken abnormally. This is achieved due to the fact that many TV sets use the horizontal flyback pulse and/or a horizontal oscillator to generate a clamp pulse approximately 4.7 microseconds after the leading edge of the horizontal sync pulse. Since the horizontal sync pulse is narrowed to about 3 microseconds ($\mu$s) and the color burst to about 1.5 $\mu$s, and the ECP signal occurs after the narrowed burst, a TV set will generate a clamp pulse coincident with the ECP signal. The reason is that the duration from the leading edge of the narrowed sync to the end of the narrowed burst is about 4.5 $\mu$s. Since the ECP signal follows the narrowed color burst, it is readily apparent that the ECP signal will be in the 4.7 $\mu$s interval after the leading edge of (narrowed) sync. Typically the ECP signal is at least 1 or 2 $\mu$s long. However, the longer the ECP signal used, the more effective is the darkening. For example, in FIG. 2A the longer ECP pulse provides maximum darkening effect. Likewise, in FIG. 4A, extending the ECP over the width of the portion C also will increase the darkening effect. As shown in FIGS. 2A, 3A and 9 these modified signals will cause darkening of the television picture. Again, for example, it should be noted that the narrowed sync, narrowed burst and ECP signal may all be position modulated or shifted to also induce the horizontal tearing scrambling effect of previous discussion.

The teachings of FIGS. 4A and 4B when combined with the teachings of the '815 provisional application, i.e., FIG. 7, cause the most effective darkening on TV sets during unauthorized viewing. The reason is that there are also some TV sets that generate video clamp pulses after the trailing edge of sync. FIGS. 4A and 4B depict an alternative embodiment wherein the ECP signal occurs immediate after the trailing edge (TE) of sync. In the case of FIG. 4A, the ECP signal should be as long as possible in the pre-sync location to provide maximum darkening. That is, the ECP can be at least 3 to 5 $\mu$s. For instance in FIG. 4A, the ECP can extend or widen from TE to just the beginning of the reference blanking level location, (BLVL). The BLVL is a dedicated blanking reference level location for the decoder of the descrambler to allow it to properly clamp the input video to blanking level.

The defeat or descrambling of the scrambled signal generated by the present invention may be accomplished by replacing or modifying the horizontal blanking interval that modifies the ECP signal so that the TV set clamps the video satisfactorily with minimal darkening effects. The methods for modifying the ECP signal can include removal, attenuation, narrowing, delaying and/or level shifting of the ECP signal. For example, removal schemes such as disclosed in U.S. Pat. Nos. 4,695,901, 4,336,554, 5,157,510, 5,194,965 or 5,625,691 (all incorporated by reference) can be used to reduce the effectiveness of the ECP signal of the present invention. U.S. Pat. No. 4,626,890 also can be used to reduce the incorrect color effects of the incorrect frequency of the portion C (see FIG. 2A for example) and is incorporated by reference.

Figure 8:
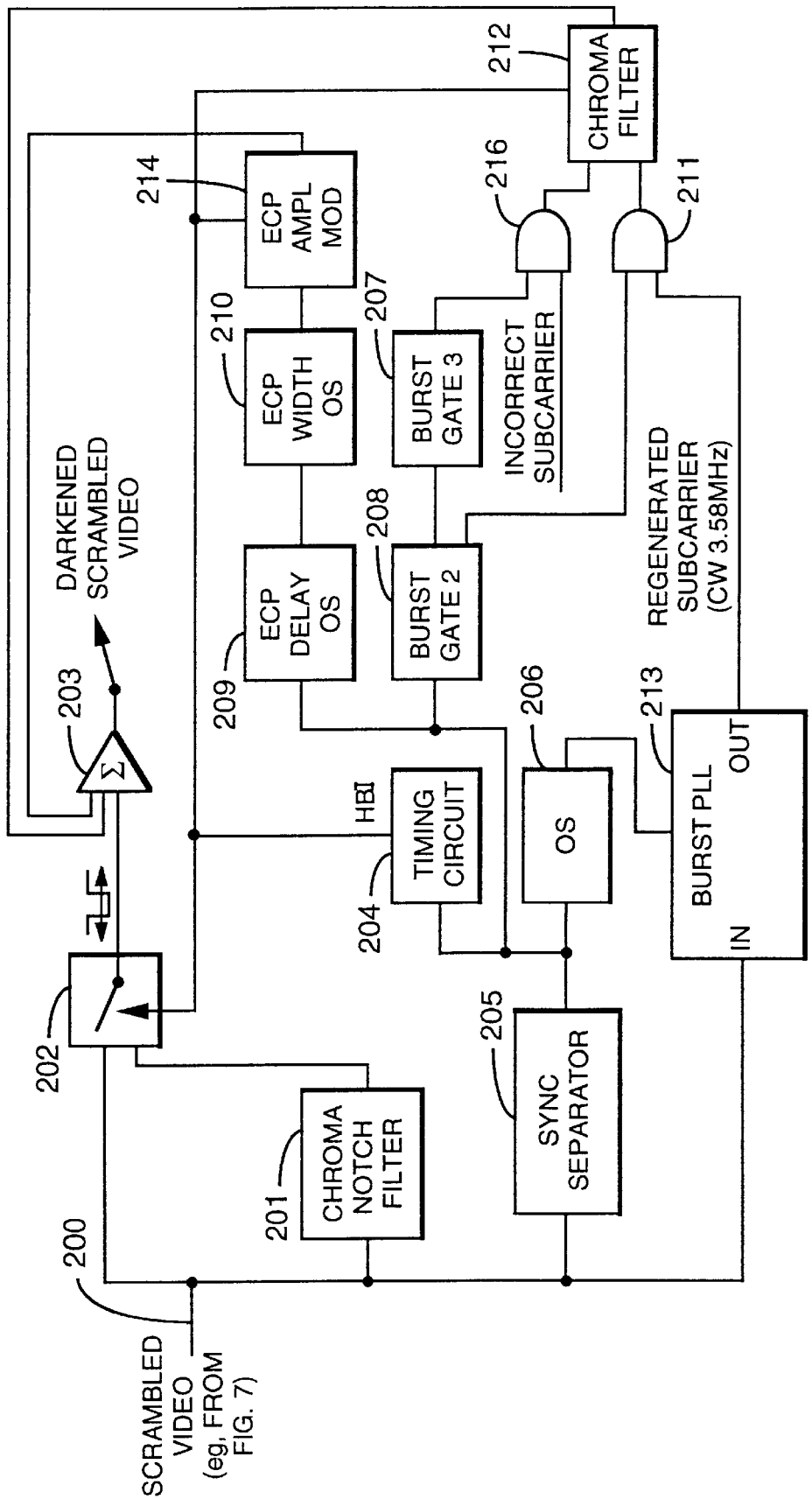
FIG. 8 is a block diagram illustrating an embodiment of the present invention.

The embodiment shown in FIG. 8 then is capable of creating the ECP signals as illustrated in the figures described above, i.e., FIGS. 2A, 3A, 4A, 4B and 9.

The enhanced scrambling effects attained by the present invention are illustrated via the circuitry of FIG. 8. To this end, in one embodiment the scrambled video from, for example, FIG. 7 is coupled to a sync separator circuit 205 via an input 200. The resulting position modulated sync output of circuit 205 is supplied to a one shot timing circuit 206 which forms a first burst gate. The first burst gate from circuit 206 is timed to the input's burst so that a phase locked loop (PLL) circuit 213 can regenerate the color subcarrier in the form of a continuous wave (c.w.). The output of the sync separator circuit 205 also is coupled to a timing circuit 204 which generates a horizontal blanking interval (HBI) signal. This HBI signal controls a switch 202 which receives the scrambled video via the input 200. The output of switch 202 is then the scrambled video described in FIG. 7 with the color burst removed via a chroma notch filter 201. The position modulated sync from sync separator 205 is also fed to a one shot timing circuit 209 and a burst gate circuit 208. One shot timing circuit 209 sets the delay of the ECP signal relative to the trailing edge of sync, that is, sets the duration of the gap in which the burst portion A, FIGS. 2A, 3A and 9, is inserted. A one shot timing circuit 210 sets the duration of the ECP signal. Circuit 209 can be modulated in time to form a varying blanking level gap or duration between the trailing edge of sync and the beginning of ECP. Varying this blanking level gap between the trailing edge of sync and the leading edge of the ECP signal can alter the television picture darkening response of a TV set. By varying the ECP pulse width in circuit 210, the darkening will vary as well when a television picture is displayed on a TV set. Finally, an ECP amplitude modulation circuit 214 can also vary the amount of darkening of a picture displayed on the TV set. Varying the darkening effect over time can be a further annoyance to the unauthorized viewer. The output of modulation circuit 214 then supplies the ECP signal to a summing amplifier 203, which also receives the scrambled signal with color burst removed from the switch 202.

Regenerated burst such as the A and B portions of FIGS. 2A, 3A, 4A, 4B and 9 is generated by a second burst gate from a burst gate circuit 208, which gate is supplied to an AND circuit 211 which also receives the continuous wave regenerated subcarrier from the PLL circuit 213. The output of the AND circuit 211 is supplied to a summing chroma filter 212.

An "incorrect" burst of incorrect color burst frequency or phase, which will cause a rainbow color effect, for example, is generated by an AND circuit 216 coupled to the burst gate circuit 208 via a burst gate circuit 207. The burst gate circuit 207 generates a third burst gate which follows the second burst gate generated by the circuit 208. The second 20 burst gate forms the burst portion B and the third burst gate forms the burst portion C. An "incorrect subcarrier" signal having a selected incorrect frequency or phase is supplied to the AND gate 216. The output of AND gate 216 is supplied to the summing chroma filter 212. The B and C type burst portions are illustrated in FIGS. 2A, 3A, 4A, and 9. The output of the chroma filter 212 is coupled to the summing amplifier 203. The output of amplifier 203 then contains the scrambled signal of the input 200 plus the new ECP darkening signals and/or the erroneous color "rainbow" effect from the ECP amplitude modulation circuit 214 and the chroma filter 212. As shown in FIG. 8, the HBI signal from the timing circuit 204 also is supplied to the ECP amplitude modulation circuit 214 and the chroma filter 212 to keep the ECP and burst signals within the HBI (in the video signal output by the summing amplifier 203.

Figure 6:
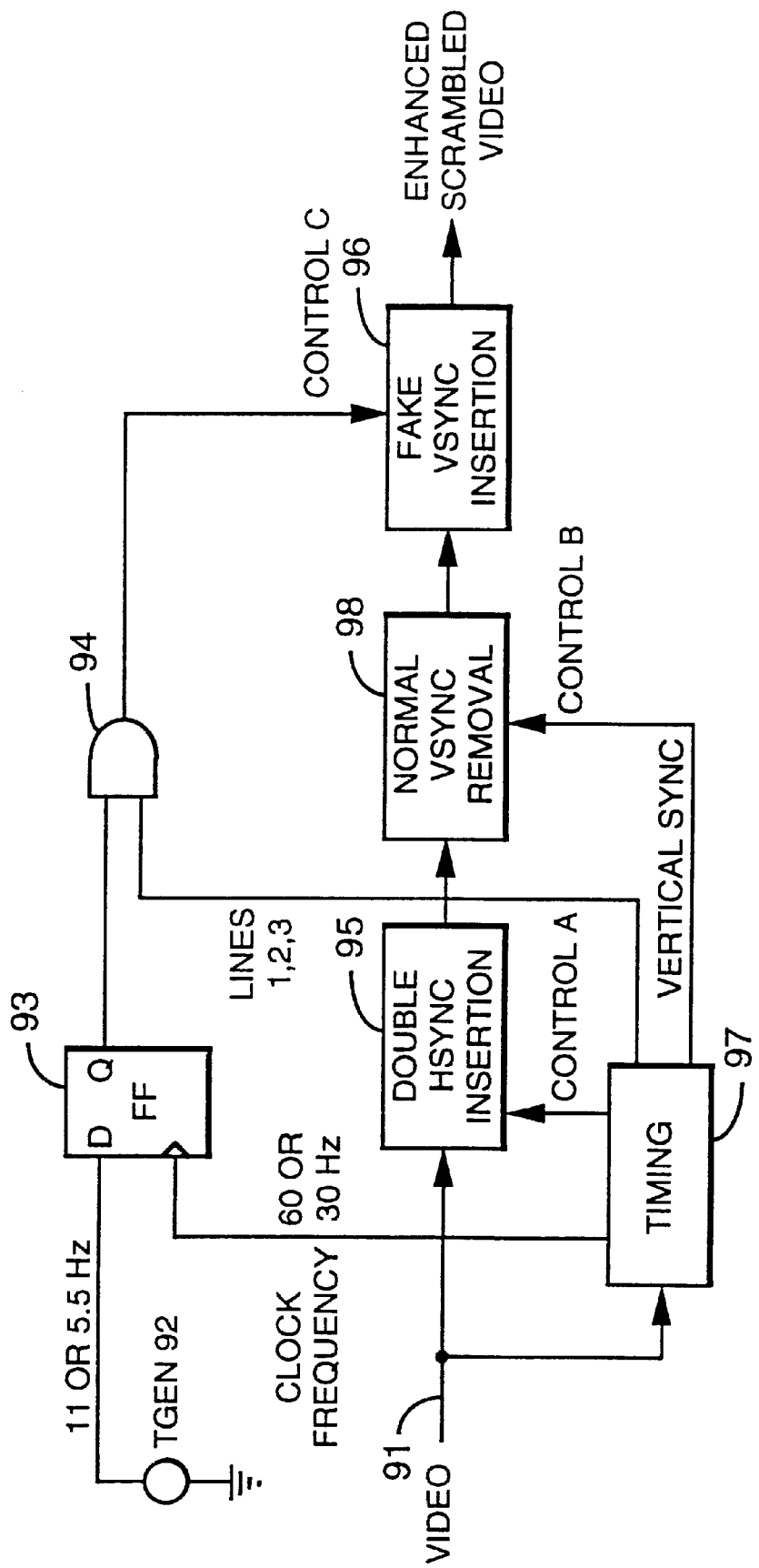
FIG. 6 is a block diagram illustrating an embodiment of the invention for inducing vertical jitter more effectively than does the prior art while also using fewer TV lines in the vertical blanking interval (VBI).

FIG. 6 illustrates a circuit and associated method for providing improved vertical scrambling for an unscrambled or previously scrambled video signal, while taking up fewer TV lines that then may be used for data, closed caption, test signals and the like. That is, instead of alternating correct and fake vertical sync signals between two or more sets of lines in the vertical blanking interval (VBI) (i.e., lines 1, 2, 3 in even fields and lines 19, 20, 21 in odd TV fields) to make the TV set jump or jitter a displacement of about 20 lines vertically, it was found that a more effective vertical scrambling can be achieved by the following:

1) the use of at least 1 line in the VBI (three lines for example which is the number of lines required for most TV sets to recognize the fake vertical sync as a "vertical trigger") to cause the vertical jumping.

2) the insertion of fake vertical pulses as mentioned in #1 above and as illustrated in FIG. 6. That is, fake vertical pulses are inserted via a generator 92 into a D flip flop 93. The clock input of flip flop 93 is clocked by vertical or frame rate frequency. The output of the flip flop 93 then allows the insertion of fake vertical pulses during the VBI or multiples of a VBI. The output of the flip flop 93 is supplied to an AND gate 94 whose other input defines lines 1, 2 and 3 supplied by a timing circuit 97 which derives timing signals from a video signal received via an input 91. As previously mentioned, the video signal on input 91 may be unscrambled program video or previously scrambled video. The output of the AND gate 94 then controls insertion of the fake vertical sync signals via a sync insertion circuit 96. As a result, the fake vertical syncs are inserted in a somewhat random manner that causes the TV sets to jitter vertically more effectively (i.e., jitter more than 20 lines of displacement) in the vertical direction.

3) preferably cause the addition of multiple horizontal sync pulses to some TV lines to cause the counter circuits in the horizontal oscillators of modem TV sets to miscount. FIG. 5 illustrates an example of multiple horizontal syncs in the HBI. In FIG. 6, a circuit 95, which receives the video signal via the input 91, adds multiple (i.e. double) horizontal syncs in response to the timing circuit 97. A circuit 98 removes the standard vertical sync signals from the respective lines of the input video prior to the insertion of the fake vertical sync signals. The output of circuit 96 may contain horizontal sync, for example, in the VBI. As shown in dashed lines in FIG. 5, the color burst signals may be superimposed on ECL signals to add the darkening effect to the scrambled signal. The whole burst, or portions of the burst, can be raised.

4) by way of example, very effective vertical scrambling is observed when the generator 92 is set to about 11 Hz and the clock frequency into flip flop 93 is set at field rate frequency. Note the clock input at flip flop 93 preferably starts either before or after the fake vertical sync pulses (i.e. before line 1 or after line 3). It is also found if the clock frequency is at frame rate or half of the vertical frequency, then the generator 98 is set to 5.5 Hz or around 18 Hz for maximum vertical scrambling. Of course other combinations are possible with varying clock frequencies supplied to flip flop 93 and varying frequencies generated by the generator 92.

Although a previously scrambled video signal is illustrated herein by way of example as the input 200 to the embodiment of the invention of FIG. 8, it is to be understood that the video signal supplied to the circuit of FIG. 8 may be an unscrambled video signal which is to be scrambled in accordance with the present invention. That is, the present invention may be used alone to provide a scrambled video signal which is prohibitively darkened or lightened, which flickers from excessive darkness to lightness and/or which includes an erroneous color "rainbow" effect which also can flicker on and off such as when the burst portion C increases and collapses.

While the preferred forms of the invention have been shown in the drawings and described herein, the invention should not be construed as limited to the specific forms shown and described since variations of the preferred forms will be apparent to those skilled in the art. Thus the scope of the invention is defined by the following claims and their equivalents.

What is claimed is:

1. A method of providing or enhancing the scrambling effect in a video signal formed of a field of video lines having a back porch with a blanking level and horizontal and vertical sync signals in horizontal and vertical blanking intervals, wherein the scrambled video signal causes an abnormal video picture to be displayed on a television set, comprising:

inserting an erroneous clamp signal of a level other than the normal blanking level in the back porch interval of the blanking interval, which level sufficiently darkens or lightens the video picture when displayed on the television set to produce additional degradation of the abnormal video picture.

2. The method of claim 1 wherein the erroneous clamp signal is generated at a voltage level greater than or less than the normal blanking level.

3. The method of claim 2 including:
amplitude modulating the voltage levels between said greater than and less than levels at a selected frequency rate.

4. The method of claim 1 wherein the horizontal blanking intervals include a correct color burst signal, including:
removing the correct color burst signal from selected lines of the video signal;
generating a replacement color burst signal of a selected time duration and following a selected time after the horizontal sync signal; and
inserting the replacement color burst signal on the erroneous clamp signal in place of the correct color burst signal.

5. The method of claim 4 wherein:
the act of generating includes generating a plurality of partial color burst signals, and the act of inserting includes inserting the partial color burst signals in selected portions of the back porch interval after the horizontal sync signal.

6. The method of claim 5 wherein at least one partial color burst signal is inserted on the erroneous clamp signal and has a frequency other than the correct color burst frequency.

7. The method of claim 6 wherein said at least one partial color burst signal is position modulated at a selected rate over a number of video lines.

8. The method of claim 6 wherein a second partial color burst signal has the correct color burst frequency and is inserted after the horizontal sync signal and on the normal blanking level.

9. The method of claim 8 wherein the plurality of partial color burst signals include a third partial color burst signal of correct color burst frequency inserted after the second partial color burst signal and on the erroneous clamp signal.

10. The method of claim 5 wherein first and second partial color burst signals are generated and inserted on the erroneous clamp signal, said second partial color burst signal being of correct color burst frequency while said first partial color burst signal has a selected incorrect color burst frequency.

11. The method of claim 10 wherein the selected incorrect color burst frequency is about plus or minus 10 through 200 Hz of correct color burst frequency.

12. The method of claim 4 including:
position modulating the horizontal sync signal over a selected time interval within the horizontal blanking interval while simultaneously position modulating the replacement color burst signal on the erroneous clamp signal.

13. The method of claim 12 wherein:
at least one partial color burst signal is inserted on the erroneous clamp signal and has a frequency other than the correct color burst frequency; and
said at least one partial color burst signal of incorrect frequency is position modulated at a selected rate over a number of video lines.

14. The method of claim 12 including:
position modulating the back porch interval, the erroneous clamp pulse and the replacement color burst signal in accordance with the position modulation of the horizontal sync signal.

15. The method of claim 1 including:
providing fake vertical sync signals; and
inserting the fake vertical sync signals into at least one line of the vertical blanking interval only prior to the normal vertical sync signal.

16. A method of providing or enhancing the scrambling effect in a video signal formed of a field of video lines having a back porch interval at a normal blanking level, horizontal and vertical sync signals and correct color burst signals in horizontal and vertical blanking intervals, wherein the enhanced scrambled video signal does not display a normal video picture on a television set, comprising:
generating an erroneous clamp pulse of a selected voltage level other than the normal blanking level; and
inserting the erroneous clamp pulse in the back porch interval at a selected time following a leading edge of the horizontal sync signal to cause the display of the video picture corresponding to the video signal to be too dark or too light to be viewable on said television set.

17. The method of claim 16 wherein the selected voltage level is around peak white level and provides an erroneous clamp level for the television set, wherein the subsequent display of the reproduced video picture is prohibitively darkened.

18. The method of claim 16 wherein the selected voltage level is lower than a normal blanking level and provides an erroneous clamp level for the television set, wherein the subsequent display of the reproduced video picture is prohibitively lightened.

19. The method of claim 16 wherein the erroneous clamp pulse is inserted about 4.7 microseconds after the leading edge of the horizontal sync signal.

20. The method of claim 16 wherein the act of generating includes:
generating erroneous voltage levels which are greater than and less than the normal blanking level; and
amplitude modulating the erroneous voltage levels at a selected rate to cause the video picture to flicker between excessive darkness and lightness.

21. The method of claim 16 for causing the additional scrambling enhancement, including:
generating an erroneous clamp pulse of a level greater than or less than the normal blanking level;
generating a plurality of partial color burst signals; and
replacing the color burst signal with the plurality of partial color burst signals in selected portions of the back porch interval after the horizontal sync signal.

22. The method of claim 21 wherein:
the plurality of partial color burst signals include first and second replacement color burst signals;
said first replacement color burst signal having a frequency other than the correct color burst frequency and being added to the erroneous clamp pulse; and
said second replacement color burst signal having a correct color burst frequency and being added to the normal blanking level immediately following the horizontal sync signal.

23. The method of claim 21 wherein:
the plurality of partial color burst signals include first and second replacement color burst signals;
said first replacement color burst signal having a frequency other than the correct color burst frequency and being added to the normal blanking level in the back porch interval; and said second replacement color burst signal having a correct color burst frequency and being added to the erroneous clamp pulse.

24. The method of claim 21 wherein:

the plurality of partial color burst signals include a first replacement color burst signal of other than the normal color burst frequency; and the first replacement color burst signal is position modulated at a selected rate over a selected number of video lines.

25. Apparatus for providing or enhancing the scrambling effect in a video signal formed of a field of video lines having a back porch interval at a normal blanking level and horizontal and vertical sync signals and color burst signals in horizontal and vertical blanking intervals, comprising:

means including a chroma filter receiving the video signal for supplying the video signal with the color burst signal removed;

timing means for providing selected timing signals within the blanking intervals:

means including a phase locked loop responsive to a selected timing signal for generating a plurality of partial color burst signals;

means responsive to a selected timing signal for providing an erroneous clamp signal of a level other than the normal blanking level; and summing means for inserting the erroneous clamp signal and the plurality of partial color burst signals into the back porch interval at selected times following a leading edge of the horizontal sync signal.

26. The apparatus of claim 25 wherein the timing means include:

a sync separator circuit;

a timing circuit responsive to the sync separator circuit; and first gating circuit for supplying a control signal to the phase locked loop of the generating means.

27. The apparatus of claim 26 wherein said means for supplying include:

the chroma filter coupled to receive the video signal and remove the color burst; and switch means receiving the video signal, and the video signal with the color burst removed, for supplying the video signal with color burst removed to the summing means in response to the timing circuit.

28. The apparatus of claim 26 wherein the means for generating include:

the phase locked loop for providing a continuous wave regenerated subcarrier signal of correct color burst frequency in response to the first gating circuit;

first logic circuit for providing first and second partial color burst signals from the regenerated subcarrier signal; and second logic circuit for providing a third partial color burst signal having a selected incorrect color burst frequency, and for supplying the multiple partial color burst signals to the summing means.

29. The apparatus of claim 28 wherein:

the first logic circuit includes a second gating circuit responsive to the sync separator circuit; and an AND gate receiving the regenerated subcarrier signal for providing the first and second partial color burst signals in response to the second gating circuit;

the second logic circuit includes a third gating circuit responsive to the second gating circuit;

an AND gate receiving a subcarrier signal of incorrect color burst frequency for providing the third partial color burst signal of incorrect color burst frequency in response to the third gating circuit; and filter means for combining the multiple partial color burst signals.

30. The apparatus of claim 25 wherein the means for providing an erroneous clamp signal include:

one shot means for setting the occurrence and duration of the erroneous clamp signal relative to the horizontal sync signal; and amplitude modulation means coupled to the one shot means for supplying the erroneous clamp signal to the summing means and for varying the amount of darkening and/or lightening applied to the video signal.

31. The apparatus of claim 25 wherein the video signal is a scrambled signal having a position modulated horizontal sync signal and the selected timing signals provided by the timing circuit are position modulated accordingly to cause corresponding position modulation of the back porch interval, of the erroneous clamp signal and of the partial color burst signals.

32. The apparatus of claim 25 including:

means for providing fake vertical sync signals; and insertion means for replacing the vertical sync signals with the fake vertical sync signals in at least one line only prior to the vertical sync signal.

33. The apparatus of claim 32 including:

means for removing the vertical sync signal; and wherein the insertion means inserts the fake vertical sync signal in one to three lines prior to the vertical sync.

34. The apparatus of claim 25 including:

means for providing double horizontal sync signals within a horizontal blanking interval; and second insertion means for inserting the double horizontal sync signals in place of the horizontal sync signal in selected video lines.

* * * * *